UNITED STATES PATENT OFFICE.

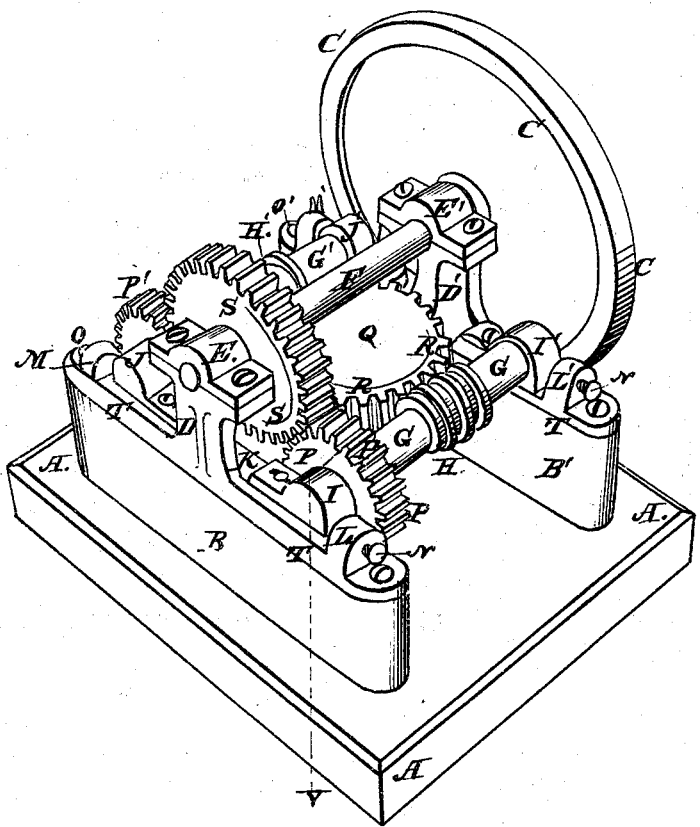
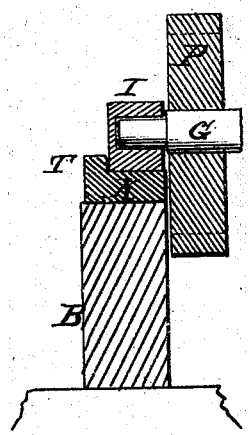

NATHAN RICHARDSON, OF GLOUCESTER, MASSACHUSETTS, ASSIGNOR TO HIMSELF AND ELI F. STACY, OF SAME PLACE.

IMPROVED STEERING APPARATUS.

Specification forming part of Letters Patent No. 49,196, dated August 1, 1865.

*To all whom it may concern:*

Be it known that I, NATHAN RICHARDSON, of Gloucester, in the county of Essex and State of Massachusetts, have invented an Improvement in Steering Apparatus; and I do hereby declare that the following is a full and exact description of the same, reference being had to the annexed drawings, making a part of this specification.

Figure I is a perspective view, and Fig. II a section on the line V, Fig. I.

My invention relates to improvements in the matter of detail of construction and arrangement of that class of steering apparatus which makes use of a worm or screw gear-wheel on the rudder-head operated by worms or screws on opposite sides of said head, which worms or screws mesh into the teeth of said wheel. For an example of one of that class of steering apparatus on which my improvements are grafted reference may be had to the United States Patent No. 4,940, which bears date January 26, 1847.

In such steering apparatus as that on which my improvements are made the action of the sea upon the rudder does not operate to turn the wheel, which therefore, instead of becoming a source of danger to the helmsman, remains under all circumstances a firm support to which he can cling. Beyond this advantage, which my apparatus has in common with others, I secure by my invention a support or a hanging of the rudder-head by means of the worm-gear on the rudder-head and the worms or screws which work therein, by which I am enabled to dispense with any other support or bearing for the rudder at or near its head. The same arrangement which steadies or supports the rudder-head and prevents fore-and-aft and athwart-ship vibrations permits upward motion thereof without breakage or derangement of the parts.

By another part of my invention I am enabled to chock or bind the rudder-head fast in any given position, so that there can be no work or play of the parts which lessens the wear of the apparatus when the vessel is at anchor, or when used as on fishing or blockading vessels, or wherever the object is to keep from departing in the night from the day station the least possible distance, while keeping at the same time sail upon the craft with but a small watch on deck.

It is in the detail of construction and arrangement of the parts by which I obtain said advantages that my invention consists, which detail and arrangement I will now proceed to describe.

In Fig. I the wheel is represented at C, and has affixed at its center the horizontal shaft F, which turns with the wheel C, being supported by the vertical pedestals D D', upon the top of which are the boxes or bearings E E'.

Upon the shaft F, and close to the bearing E, the spur-gear S is affixed. Its teeth play in the two pinions P P', which are keyed to two horizontal shafts, G G', these shafts being parallel with the main shaft F, and their ends turning respectively in the bearings I I' and J J'. (See also Fig. II.) These bearings are adjustable, being capable of moving to and from the main gear S and the teeth R R, which surround the rudder-head Q. This adjustment is effected by turning the screws N N' O O', by which the elongated bases of the bearings I and J are made to slide upon the horizontal bars K, which rest upon the two parallel timbers B B'. These timbers are bolted to the deck of the vessel A, and support the whole apparatus in a suitable position to insure the requisite action upon the gears R of the rudder-head Q.

The adjusting-screws N and O play through nuts in the projecting parts L L' and M M' of the bed-piece T K. The raised rim T serves to keep the boxes I I' and J J' in line. When the adjustment is made the boxes are confined to the timber or iron base B B' by suitable screw-bolts.

Upon each of the counter-shafts G G', and about half-way between the pinions and the bearings I' J', are placed the endless screws H H', which are firmly keyed to the shafts, one being a left-hand and the other a right-hand screw.

When the wheel is turned the central or main spur-gear turns the pinions and their shafts in the same direction, and as these shafts are on opposite sides of the rudder-head the attached helices are cut in opposite directions, thus giving motion to the rudder in the same direction. By reversing the motion of the wheel the motion of the rudder is instantly reversed, there being no backlash between the worms and gear.

By inspection of the drawings it will be seen that the centers of the worm or endless-screw shafts are in the same plane with the line drawn around the screw-gear on the rudder-head in the center of the face of its teeth. Hence it will be obvious that if the rudder is jerked violently upward, as sometimes happens, it will not break or bend the shafts, as in the organization shown in the patent before referred to, but the teeth of the screw-gear on the rudder-head will simply slip upward on the threads of the screws and will by gravity return without doing damage. This upward motion is too slight to cause the rudder-head to come into contact with the steering-wheel shaft.

I claim—

1. In a steering apparatus made with a worm-gear on the rudder-head and operated by means of worms or endless screws meshing therein, the arrangement of said screws outside of the periphery of said gear and substantially in the plane, as and for the purpose specified.

2. Arranging the endless screws with reference to the gear on the rudder-head, so that by forcing the screws toward the center of the rudder-head it will be prevented from lateral motions.

NATHAN RICHARDSON. [L. S.]

In presence of—
 DAVID W. LOW,
 EMMA F. PRINDALL.